(12) United States Patent
Luce

(10) Patent No.: US 8,727,273 B2
(45) Date of Patent: May 20, 2014

(54) SHRINK SHOCK STRUT LOCKING MECHANISM FOR RETRACTABLE AIRCRAFT LANDING GEAR

(75) Inventor: William E. Luce, Colleyville, TX (US)

(73) Assignee: Goodrich Corporation, Charlotte, NC (US)

( * ) Notice: Subject to any disclaimer, the term of this patent is extended or adjusted under 35 U.S.C. 154(b) by 747 days.

(21) Appl. No.: 12/807,538

(22) Filed: Sep. 8, 2010

(65) Prior Publication Data

US 2012/0056035 A1  Mar. 8, 2012

(51) Int. Cl.
*B64C 25/26* (2006.01)
(52) U.S. Cl.
USPC .................................................. 244/102 SL
(58) Field of Classification Search
USPC ........ 244/102 A, 102 SL, 102 SS, 50, 138 R, 244/102 R
See application file for complete search history.

(56) References Cited

U.S. PATENT DOCUMENTS

| 2,643,834 | A | * | 6/1953 | Watman | 244/102 SS |
| 2,906,474 | A | * | 9/1959 | Cravero | 244/50 |
| 3,393,883 | A | * | 7/1968 | Smith et al. | 244/102 R |
| 3,749,361 | A | * | 7/1973 | Johnson | 254/2 R |
| 4,047,681 | A | * | 9/1977 | Hartel | 244/102 SS |

* cited by examiner

*Primary Examiner* — Valentina Xavier
(74) *Attorney, Agent, or Firm* — Snell & Wilmer L.L.P.

(57) ABSTRACT

A shrink shock strut assembly for retractable aircraft landing gear is disclosed which includes an elongated strut cylinder, an elongated strut piston coaxially mounted for reciprocal movement within the strut cylinder between a shrunk condition when the landing gear is retracted into a wheel well of an aircraft and a fully extended condition when the landing gear is deployed from the wheel well for landing the aircraft, and a blocking mechanism operatively associated with the strut cylinder and mounted for movement into a blocking position with respect to the strut piston, when the landing gear is retracted within the wheel well, to prevent axial movement of the strut piston into the fully extended condition within the wheel well.

8 Claims, 9 Drawing Sheets

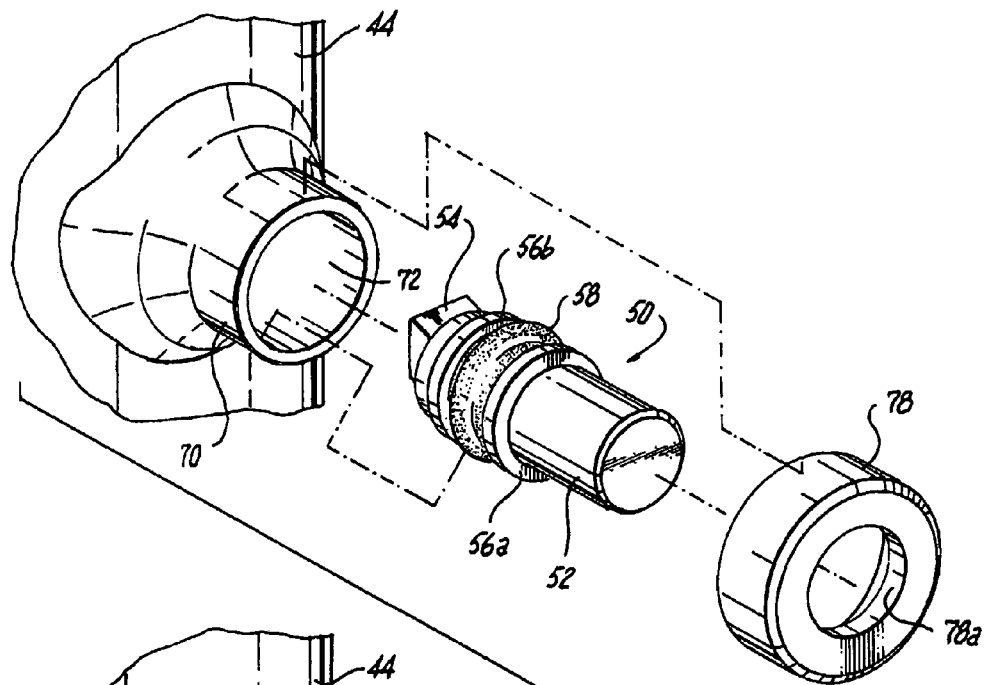
*Fig. 5*
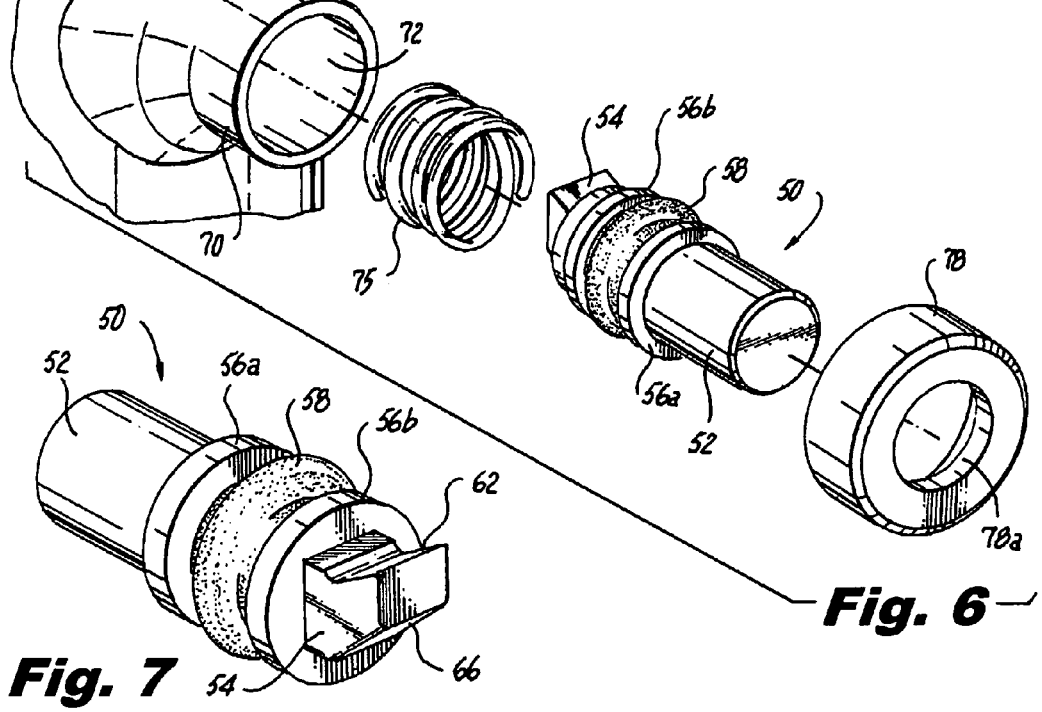
*Fig. 6*
*Fig. 7*

SHRINK SHOCK STRUT LOCKING MECHANISM FOR RETRACTABLE AIRCRAFT LANDING GEAR

BACKGROUND OF THE INVENTION

1. Field of the Invention

The subject invention is directed generally to retractable aircraft landing gear, and more particularly, to a locking mechanism for preventing a compressed shrink shock strut from transitioning into an extended position within the wheel well of an aircraft.

2. Background of the Related Art

Retractable landing gear for aircraft are well known in the art. In general, retractable landing gears include an elongated shock strut having an upper end that is pivotally mounted to the frame of the aircraft about a retraction axis for pivotal displacement between a vertical, downwardly extending, landing and ground support position, and a horizontal, retracted position nested within a wheel well in a lower surface of the aircraft wing or fuselage.

In such landing gears, the shock strut includes telescopically disposed cylinder and piston members defining a pneumatic or hydraulic spring chamber. Pressure within the chamber biases the strut toward a telescopically extended condition. When landing or at rest on the ground, the weight of the aircraft on the landing gear compresses the shock, forcing the strut to a relatively shortened condition, which may be a number of inches shorter than the extended condition. With the aircraft airborne and the landing gears down, the unloaded gears and associated shock struts assume their fully extended position. For sustained flight, the fully extended landing gears are rotated into the retracted position to reside within the wheel wells of the aircraft.

Although aircraft have been designed to accommodate retracted landing gear with fully extended struts, such a configuration does not always permit the most advantageous placement of the landing gear and its supporting structures within a wheel well. Moreover, the space within the wheel well of an aircraft is often limited due to design constraints. It is generally desirable therefore to minimize the amount of space required by the retractable landing gear.

One approach to saving space in the wheel well is to shorten the length of the landing gear before or during its retraction cycle into a stowed position. Examples of prior art shock struts capable of being compressed into a shortened state for efficient stowage in a wheel well of an aircraft are disclosed in U.S. Pat. No. 4,047,681 to Hartel and U.S. Pat. No. 5,908,174 to Churchill et al.

When the length of a landing gear is shortened or otherwise shrunk for retraction, it is possible that the mechanism that compressed the shrink shock strut could fail, allowing the strut to decompress and extend back to its fully extended condition. If this occurs while the landing gear is retracted within the wheel well, then it is likely the strut will become jammed in the wheel well, rendering it unable to deploy for landing the aircraft. This would lead to a gear up landing, which is highly undesirable as it could cause further damage to the landing gear as well as the aircraft itself.

Efforts have been made to prevent a shortened or shrunken landing gear shock strut from decompressing into a fully extended position within the wheel well of an aircraft in the event of a system failure. For example, it is known to provide a catch mechanism within the wheel well to prevent the upper torque arm of the landing gear from rotating past a certain point in its travel, and thereby hold the strut from reaching a fully extended position within the wheel well in the event of a compression system failure. With this prior art method, the upper torque arm of the landing gear is loaded in such a manner that the strut is still permitted to extend well beyond its shrunk condition. In addition, this prior art method requires excessive room and additional structure within the wheel well.

It would be beneficial therefore to provide a mechanism to prevent movement of a shortened or shrunken shock strut into a fully extended condition while it is retracted within the wheel well of an aircraft, that creates a relatively stiff load path when preventing the strut from extending, and which takes up a minimal amount of space with the wheel well. The shrink shock strut locking mechanism described and illustrated herein provides these and other benefits.

SUMMARY OF THE INVENTION

The subject invention is directed to a new and useful shrink shock strut assembly for retractable aircraft landing gear. The assembly includes an elongated strut cylinder and an elongated strut piston coaxially mounted for reciprocal movement within the strut cylinder between a shrunk condition when the landing gear is retracted into a wheel well of an aircraft and a fully extended condition when the landing gear is deployed from the wheel well for landing the aircraft.

The assembly further includes a blocking mechanism that is operatively associated with the strut cylinder and mounted for movement into a blocking position with respect to the strut piston, when the landing gear is retracted within the wheel well, to prevent axial movement of the strut piston into the fully extended condition within the wheel well. This undesirable movement of the strut piston could arise as a result of a hydraulic or mechanical failure condition within the shrink shock strut assembly, or as a result of the effects of temperature changes on the structural components of the landing gear during flight.

A capture notch is associated with the strut piston to engage the blocking mechanism in the event that the strut piston moves toward the fully extended condition within the wheel well. Preferably, the blocking mechanism comprises a plunger mounted for movement from a retracted position spaced from the strut piston to the blocking position relative to the capture notch. Preferably, the capture notch and a head portion of the plunger have complementary angled engagement surfaces for positively locking the two strut components together.

In one embodiment of the invention, the plunger is normally biased into the retracted position by hydrodynamic pressure. In another embodiment, the plunger is normally biased into the retracted position by a biasing spring. In one embodiment of the invention, a static abutment structure is provided for moving the plunger into the blocking position when the landing gear is retracted into the wheel well. The static abutment structure is associated with the wheel well of the aircraft. In another embodiment, a dynamic abutment structure is provided for moving the plunger into the blocking position when the landing gear is retracted into the wheel well. The dynamic abutment structure is associated with the landing gear itself, and may be provided on a drag brace, spindle or other feature of the landing gear geometry.

The subject invention is also directed to a shrink shock strut assembly for retractable aircraft landing gear which includes an elongated strut cylinder, an elongated strut piston having an upper end portion coaxially mounted for reciprocal movement within the strut cylinder, a strut bearing connected to the upper portion of the strut piston within the strut cylinder and having a capture notch formed therein, and a plunger operatively associated with the strut cylinder.

The plunger is mounted for movement between a retracted position spaced from the strut bearing when the strut piston is in a fully extended condition deployed from the wheel well of the aircraft and a blocking position with respect to the capture notch when the strut piston is in a shrunk condition within the wheel well of the aircraft, to prevent axial movement of the strut piston into the fully extended condition within the wheel well.

The subject invention is also directed to a new and useful method of preventing a compressed shrink shock strut assembly of a retractable aircraft landing gear from moving to a fully extended condition within a wheel well of an aircraft. The method includes the steps of axially compressing a strut piston and strut cylinder of a shrink shock strut assembly into a shrunk condition for retraction into the wheel well of an aircraft, and blocking axial movement of the strut piston into a fully extended condition while the landing gear is retracted within the wheel well. The method further includes the steps of engaging the strut piston upon its movement toward a fully extended condition, and subsequently disengaging the strut piston by axially compressing the strut piston into the strut cylinder, which would typically occur when the aircraft touches down for landing.

These and other aspects of the shrink shock strut locking mechanism of the subject invention and the method of blocking axial decompression of a retracted shrink shock strut will become more readily apparent from the following detailed description of the preferred embodiments taken in conjunction with the drawings.

BRIEF DESCRIPTION OF THE DRAWINGS

So that those having ordinary skill in the art to which the subject invention pertains will more readily understand how to make and use the shrink shock locking mechanism of the subject invention, preferred embodiments thereof will be described in detail hereinbelow with reference to the drawings, wherein:

FIG. 5 is an exploded perspective view of the hydro-dynamically biased strut blocking mechanism shown in FIG. 4, with parts separated for ease of illustration;

FIG. 6 is an exploded perspective view of an alternative embodiment of the strut blocking mechanism of the subject invention, which is spring biased;

FIG. 7 is a perspective view of the plunger which forms part of the strut blocking mechanism of the subject invention;

DETAILED DESCRIPTION OF THE PREFERRED EMBODIMENTS

Figure 1:
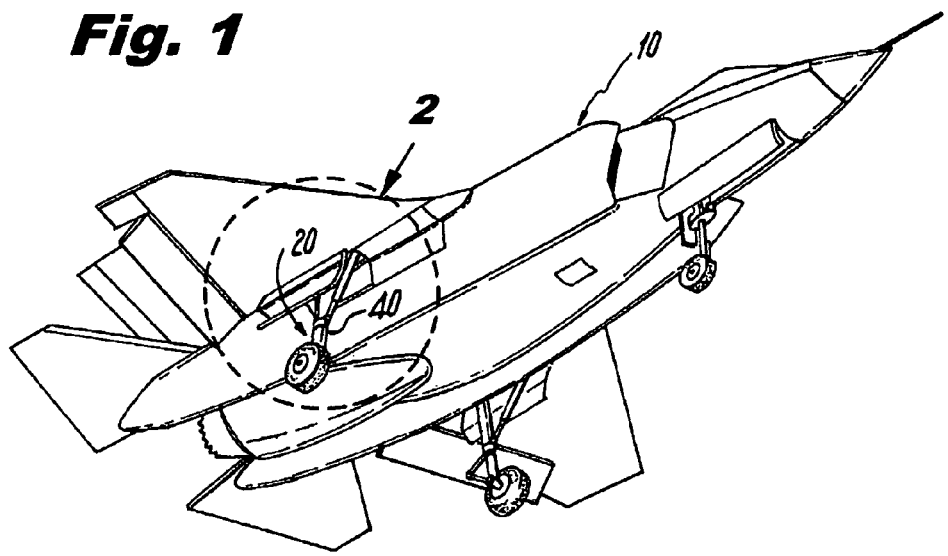
FIG. 1 is an illustration of an aircraft that employs retractable landing gear including the shrink shock strut locking mechanism of the subject invention.

Referring now to the drawings wherein like reference numerals identify similar structural elements or features of the subject invention, there is illustrated in FIG. 1 an aircraft 10 which employs retractable landing gear 20 including a shrink shock strut assembly 40 having an upper end that is pivotally mounted to the aircraft frame. An exemplary shrink shock strut assembly of the type employed with the retractable landing gear 20 of aircraft 10 is disclosed in U.S. Patent Application Publication 2010/0096499 to Luce et al., the disclosure of which is incorporated herein by reference in its entirety.

Figure 2:
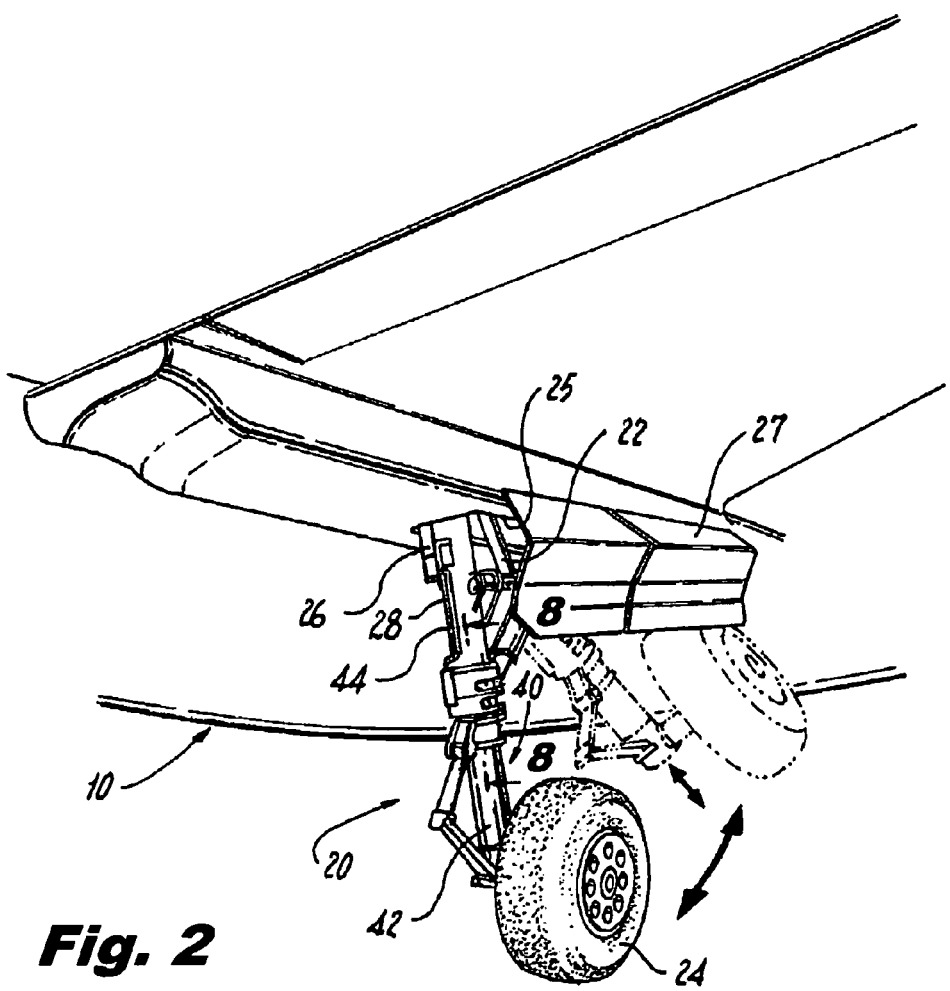
FIG. 2 is a perspective view of the landing gear employed on the aircraft shown in FIG. 1, with the landing gear shown in a fully extended condition deployed from the wheel well of the aircraft for landing and with the landing gear shown in phantom lines in a shrunk condition as it is retracted into the wheel well of the aircraft for flight.

As illustrated in FIG. 2, landing gear 20 is adapted and configured for movement about a retraction axis between a fully extended condition when it is deployed from the wheel well of the aircraft 10 for vertical or short take-off and landing, and a compressed or shrunk condition as it is retracted into a horizontal position nested within the wheel well 25 of the aircraft 10 during flight. The landing gear 20 is driven between the vertically deployed and horizontally retracted positions by hydraulic fluid provided by the aircraft 10 to a landing gear actuator 22.

Figure 3:
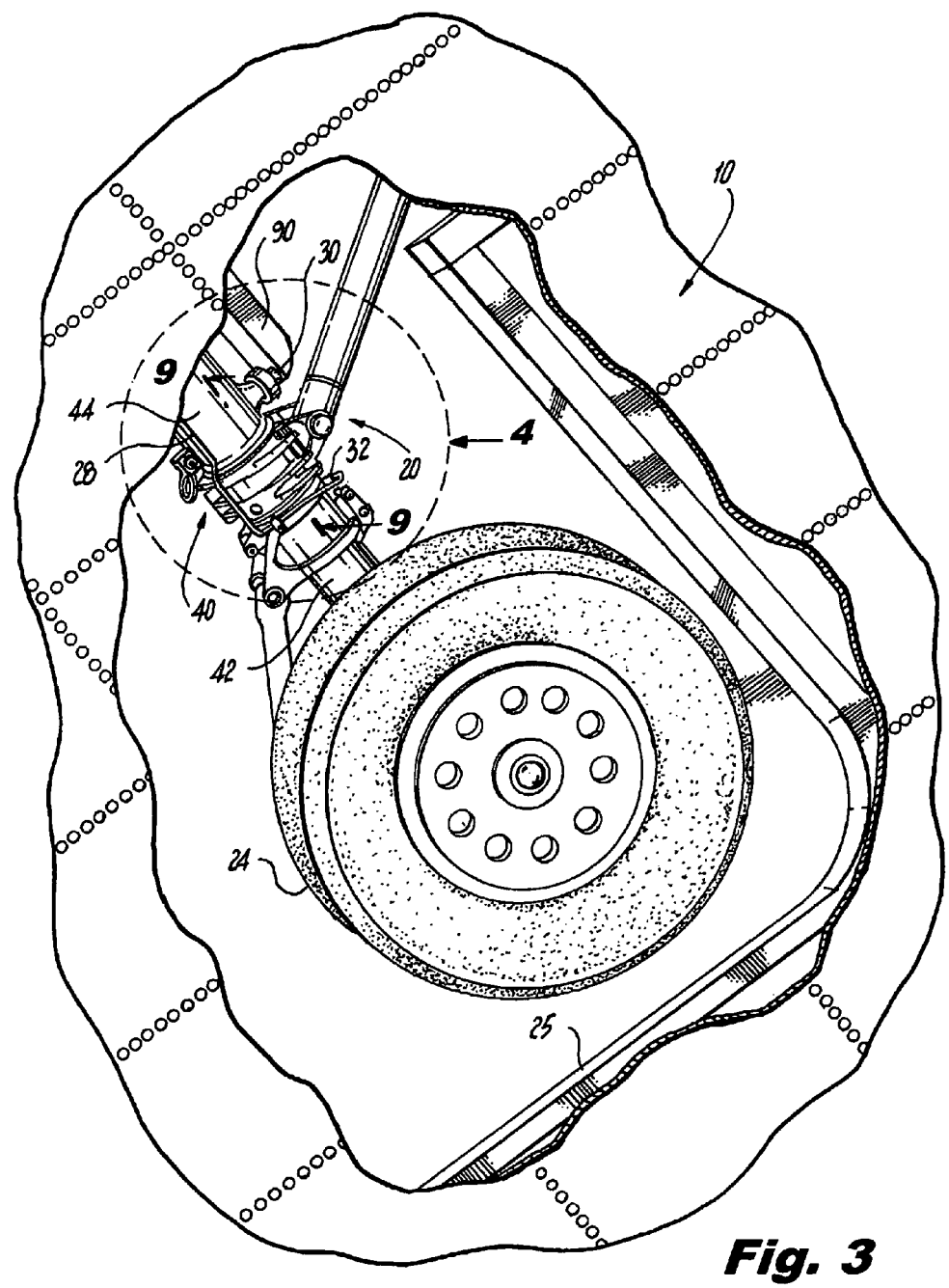
FIG. 3 is a cutaway view of the lower surface of aircraft of FIG. 1 illustrating the landing gear retracted within the wheel well, with the shrink shock strut assembly disposed in a shrunk condition and the strut blocking mechanism of the subject invention depressed through interaction with a static abutment structure located within the wheel well.

Once the landing gear 20 has been fully retracted into the wheel well 25 of the aircraft 10 for sustained flight, as illustrated in FIG. 3, the strut locking mechanism 30 of the subject invention is mechanically moved into a blocking position by a static abutment structure 90, to prevent the primary telescoping components of the shrink shock strut assembly 40 from axially moving into a fully extended position within the wheel well 25, as explained in more detail hereinbelow.

Referring still to FIG. 2, the shrink shock strut assembly 40, which forms part of the landing gear 20, includes an elongated tubular strut piston 42 that is coaxially mounted for reciprocal movement within an elongated tubular strut cylinder 44. The landing gear actuator 22, which drives landing gear 20, is operatively associated with the upper portion of the strut cylinder 44. A wheel assembly 24 of landing gear 20 is rotatably mounted to a lower portion of strut piston 42.

The strut cylinder 44 of shrink shock strut assembly 40 is in fluid communication with a transfer cylinder 26 through a closed hydraulic circuit defined in part by an elongated tubular transfer conduit 28. As shown in FIG. 3, the transfer conduit 28 delivers hydraulic fluid to a transfer port 32 on strut cylinder 44. The hydraulic fluid for this closed circuit is supplied by the aircraft's hydraulic supply under pressure. Reciprocal movement of the strut piston 42 relative to the strut cylinder 44 between a compressed or shrunk position and the fully extended position is effectuated by the transfer of a specific volume of hydraulic fluid to and from the transfer cylinder 26 by way of transfer conduit 28 in the manner described in U.S. Patent Application Publication 2010/0096499 to Luce et al.

It should be understood that reciprocal movement of the shrink shock strut assembly 40 is controlled independent of the landing gear actuator 22. Initially, as the landing gear 20 deploys from the wheel well 25, the strut piston 42 may remain compressed within the strut cylinder 44. Once the landing gear 20 is clear of the wheel well 25 and surrounding doors 27, the strut piston 42 may be driven to its fully extended length by actuator 22. As will be described in more detail below, failure of the transfer cylinder 26 or fluid transfer conduit 28, could result in the unintended and undesirable movement of the strut piston 42 to a fully extended position within the wheel well 25, which is the reason for the development of the strut locking mechanism 30 of the subject invention.

Figure 4:
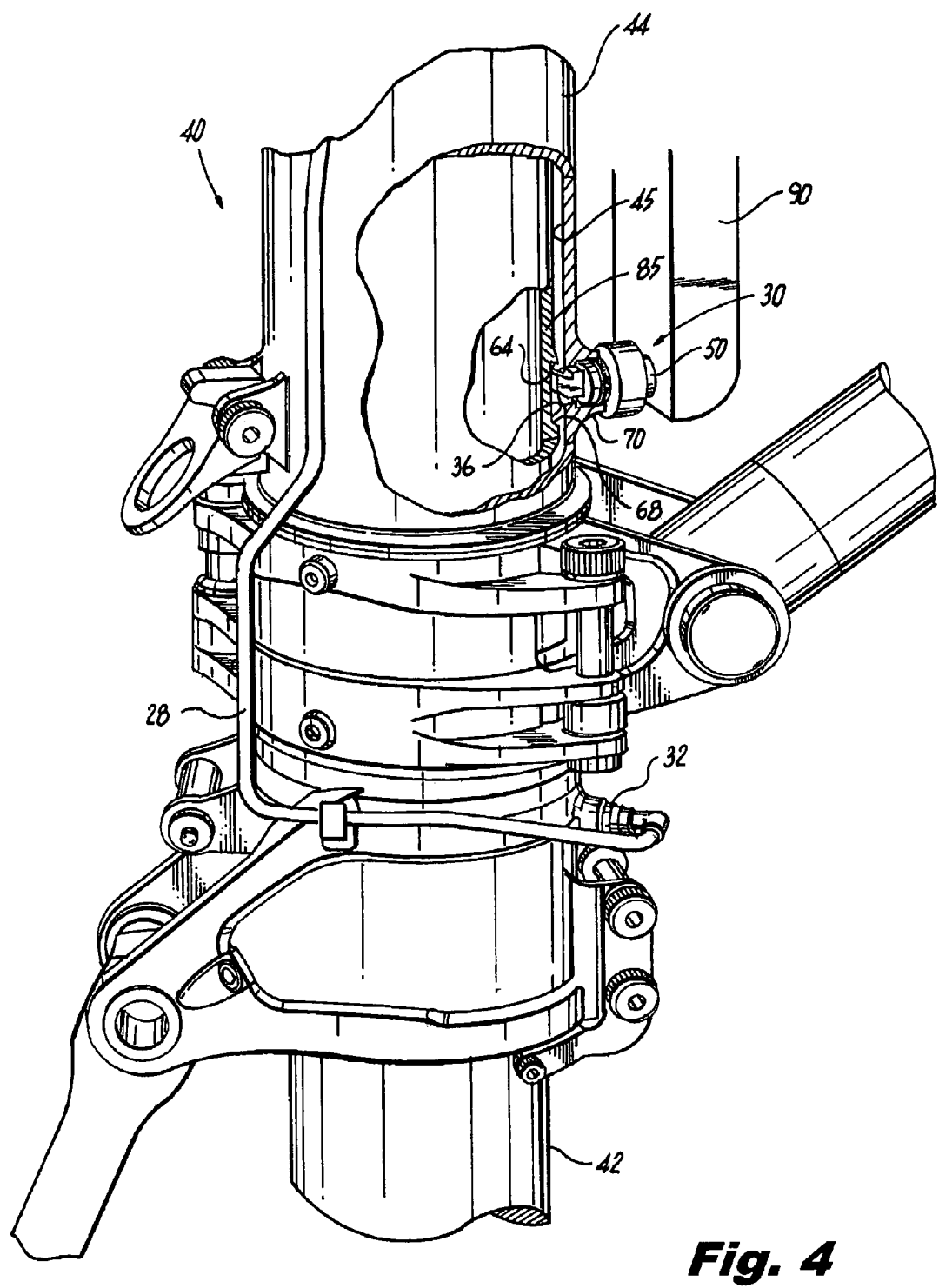
FIG. 4 is an enlarged localized view of the shrink shock strut assembly shown in FIG. 3, illustrating the plunger of the strut blocking mechanism associated with the strut cylinder disposed in a blocking position relative to the capture notch associated with the strut piston.

Referring to FIG. 4, the strut locking mechanism 30 includes a plunger 50 that is operatively supported by strut cylinder 44. Plunger 50 is mounted for movement with respect to an elongated capture notch 36 that is operatively associated with the strut piston 42. The elongated capture notch 36 includes an angled leading edge surface 64 and an angled trailing edge surface 68.

Referring to FIGS. 5 through 7, the plunger 50 of strut locking mechanism 30 includes an upper body 52 and a lower engagement head 54. The lower engagement head 54 and upper body 52 are separated from one another by spaced annular flanges 56a, 56b that retain an O-ring seal 58 therebetween. As best seen in FIG. 7, the engagement head 54 of plunger 50 includes angled engagement surface 62 for engaging the leading edge surface 64 of capture notch 36. The head 54 of plunger 50 further includes an angled camming surface 66 for interacting with the trailing edge surface 68 of capture notch 36.

The complementary angled engagements surfaces 62, 64 of plunger head 54 and capture notch 36 serve to positively lock the plunger 50 and strut piston 42 together in the event that the piston 42 tries to move to a fully extended position when the landing gear 20 is retracted within the wheel well 25 of the aircraft 10. Once the complementary angled surfaces 62, 64 of the plunger head 54 and capture notch 36 have been engaged, the strut locking mechanism 30 cannot be disengaged until the wheel 24 of aircraft 10 touches the ground and the strut assembly 40 begins to compress. The complementary camming surfaces 66, 68 of plunger head 54 and capture notch 36 serve to urge the plunger 50 back to its normally retracted position when the aircraft 10 lands with the landing gear 20 deployed in a partially extended position, as discussed in greater detail hereinbelow. It should be appreciated that the hydrodynamic pressure within strut assembly 40 will normally be sufficient to provide the motivational force to move the plunger 50 back into a retracted position, but failing that, the camming interaction between complementary surfaces 66, 68 would do so.

Referring to FIG. 5, the plunger 50 of strut locking mechanism 30 is movably mounted in a housing 70 formed integral with the wall of the lower portion of strut cylinder 44. More particularly, plunger 50 is mounted for axial movement between the normally retracted position shown in FIG. 8, which corresponds to the deployed position of the landing gear 20, and the functionally depressed or blocking position shown in FIG. 9, which corresponds to the retracted position of the landing gear 20.

Figure 8:
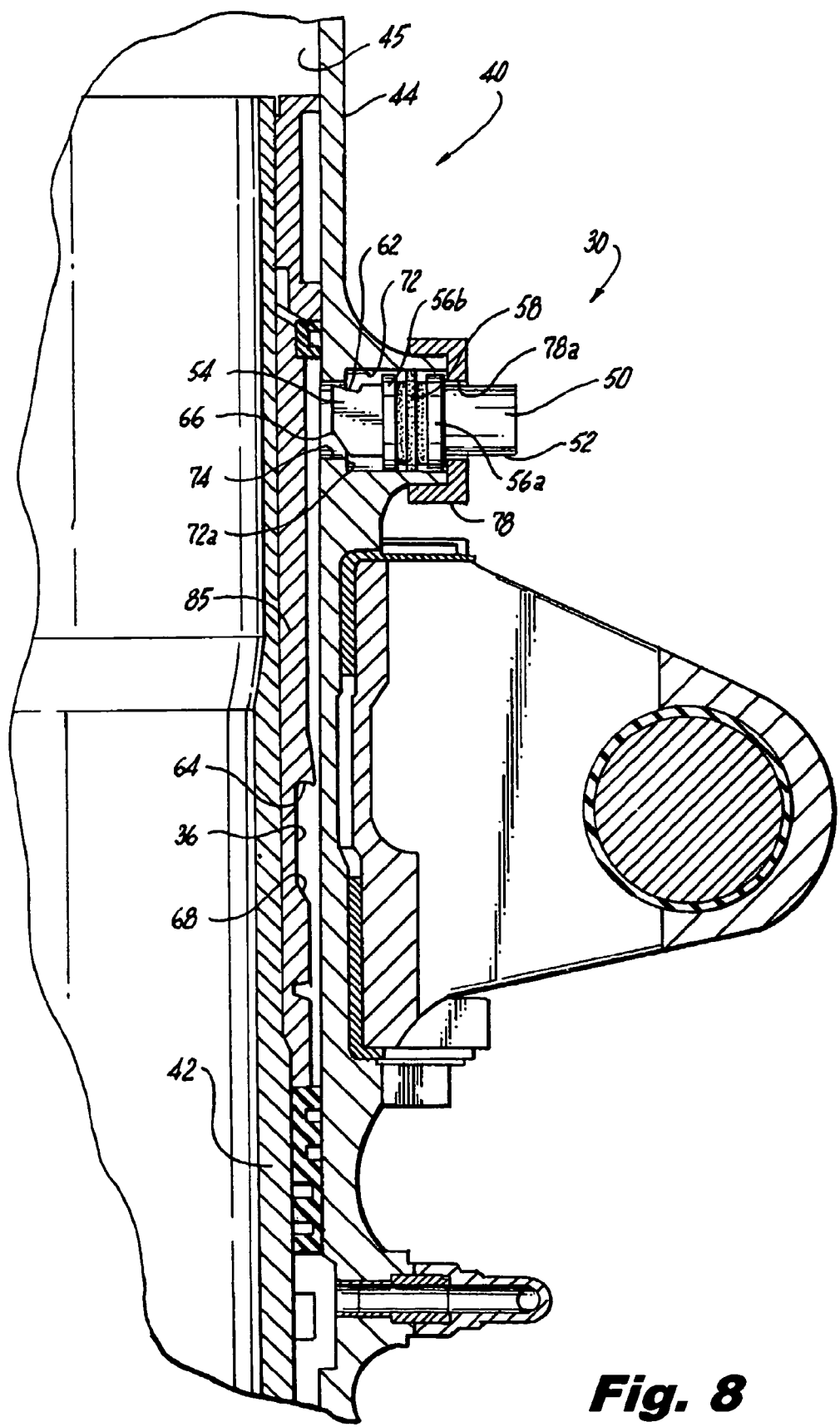
FIG. 8 is a cross-sectional view of the shrink shock strut assembly of the subject invention in a fully extended condition taken, along line 8-8 of FIG. 4, with the plunger shown in a retracted position under the bias of hydrodynamic pressure within the strut assembly.

In accordance with one embodiment of the subject invention, the plunger 50 is biased into the retracted position of FIG. 8 through hydrodynamic system pressure within the shock strut assembly 40. In an alternative embodiment of the subject invention, plunger 50 may be biased into a normally retracted position by way of a coiled spring 75 or a similar biasing member, as illustrated for example in FIG. 6. It is also envisioned that plunger 50 may be biased into the retracted position by hydrodynamic system pressure and a coiled biasing spring.

Figure 9:
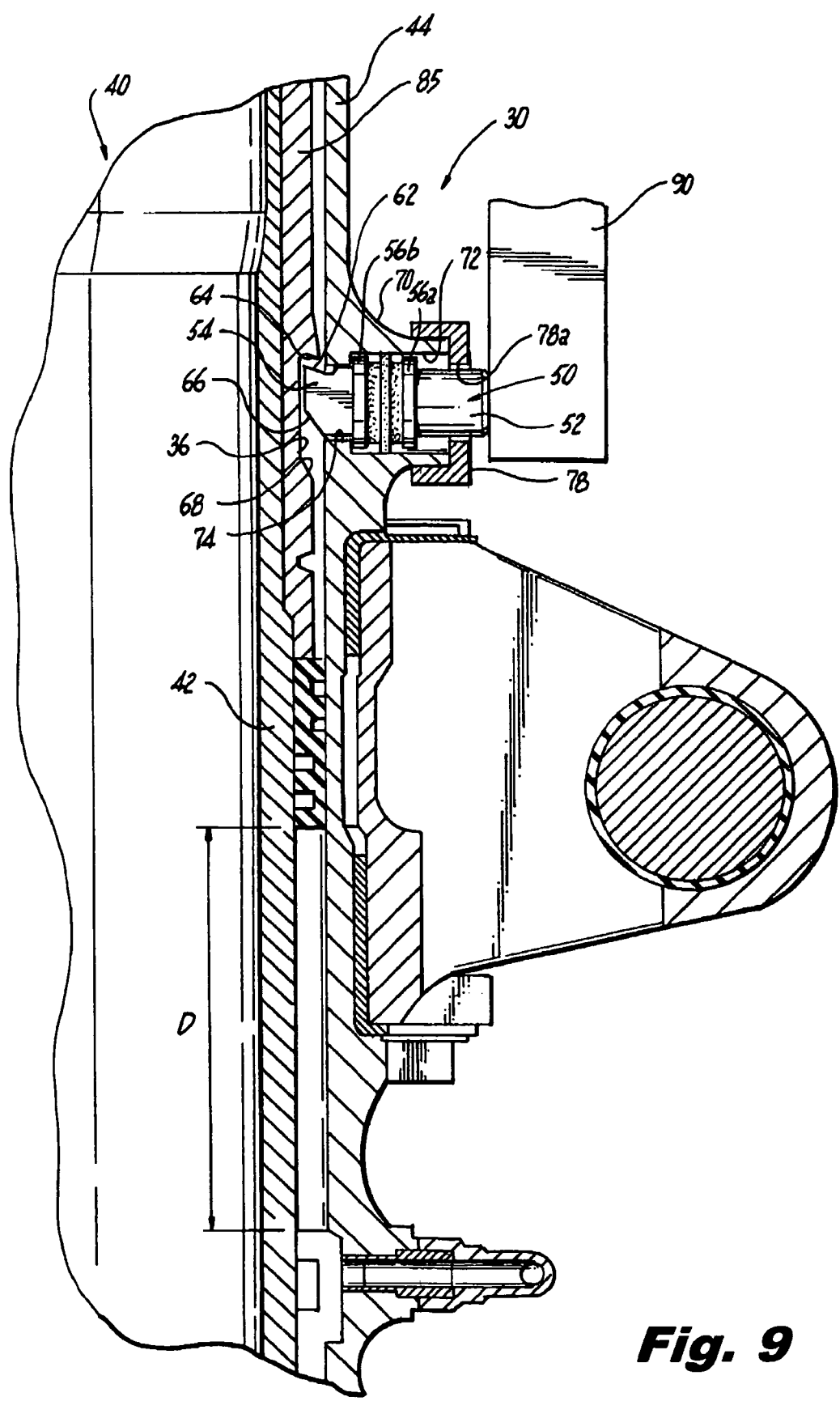
FIG. 9 is a cross-sectional view of the shrink shock strut assembly of the subject invention in a shrunk or shortened condition taken along line 9-9 of FIG. 3, with the plunger in a blocking position relative to the capture notch associated with the strut bearing of the strut piston.

Referring to FIGS. 8 and 9, the housing 70 in which plunger 50 is mounted for movement includes a stepped interior bore formed by an upper chamber 72 and a lower chamber 74. The upper chamber 72 is dimensioned and configured to support the spaced annular flanges 56a, 56b and O-ring seal 58. The lower chamber 74 opens into the interior bore 45 of strut cylinder 44 and is dimensioned and configured to support the head 54 of plunger 50. The axial movement of plunger 50 between the retracted position of FIG. 8 and the depressed position of FIG. 9 is limited by the axial boundaries of the upper chamber 72 of housing 70, which is defined by the floor of the upper chamber 72 and the under surface of the cap 78 that encloses the plunger 50 within housing 70. More particularly, the interaction of the upper flange 56a with the under surface of the cap 78 and the interaction of the lower flange 56b with the floor 72a of the upper chamber 72 limits the travel distance of plunger 50 relative to the capture notch 36. The cap 78 is preferably joined to plunger housing 70 by threading or other conventional landing gear design techniques known in the art. Cap 78 includes a central aperture 78a for accommodating the passage and movement of plunger body 52.

Referring to FIG. 8, wherein the shrink shock strut assembly 40 is shown in a fully extended condition, corresponding to deployed landing gear, the strut piston 42 includes a bearing assembly 85 which concentrically supports the strut piston 42 within the interior bore 45 of the strut cylinder 44. The bearing assembly 85 includes associated structure which is described in greater detail in U.S. Patent Application Publication 2010/0096499 to Luce et al., which has been incorporated herein by reference. The capture notch 36 of strut locking mechanism 30 is formed within the strut bearing 85. It is envisioned however, that capture notch 36 could be formed in other internal components of the strut assembly 40, provided they are operatively associated with the strut piston 42 in a way that its axial movement could be advantageously blocked by the plunger 50 when it is in a depressed blocking position.

As described previously, capture notch 36 includes an angled engagement surface 64 defined at a leading edge thereof and an angled camming surface 68 defined at a trailing edge thereof, for interacting with corresponding surfaces 62, 66 formed on the head 54 of plunger 50. As shown in FIG. 8, when the shrink shock assembly 40 is in the fully extended position, the head 54 is fully retracted within the lower chamber 74 of plunger housing 70. This prevents the head 54 of plunger 50 from contacting or otherwise interfering with the strut bearing 85 when strut piston 42 reciprocates within the strut cylinder 44 during normal operation.

Referring now to FIG. 9, wherein the shrink shock assembly 40 is shown in a compressed or shrunk condition corresponding to the landing gear 20 being retracted into the wheel well 25 of aircraft 10, and the plunger 50 of the strut locking mechanism 30 is shown in a depressed position. Through compression, facilitated by the transfer of fluid into shock strut 40 from the transfer cylinder 26, as described above, the strut piston 42 travels a distance "D" so that capture notch 36 is aligned with the head 54 of plunger 50. In this aligned position, the angled engagement surface 64 at the leading edge of capture notch 36 is spaced beyond the corresponding angled engagement surface 62 of the head 54 of plunger 50. This corresponds to the blocking position of the plunger 50. In this blocking position, there is no positive contact between the head 54 of plunger 50 and the engagement surface 62 of capture notch 36. The head 54 of plunger 50 simply resides within the capture notch 36. At such a time, the lower flange 56b of plunger 50 is seated on the floor 72b of the upper chamber 72 of plunger housing 70.

As shown in FIG. 9, the plunger 50 of strut locking mechanism 30 is moved into the depressed position through the interaction of plunger body 52 with a static abutment surface 90 located within the wheel well 25 of aircraft 10. (See also FIGS. 3 and 4). More particularly, the static abutment surface 90 is located in a position such that the plunger 50 is depressed into a blocking position with respect to capture notch 36 only after the strut piston 42 has been fully compressed into the strut cylinder 44 and the landing gear has been retracted.

Figure 16:
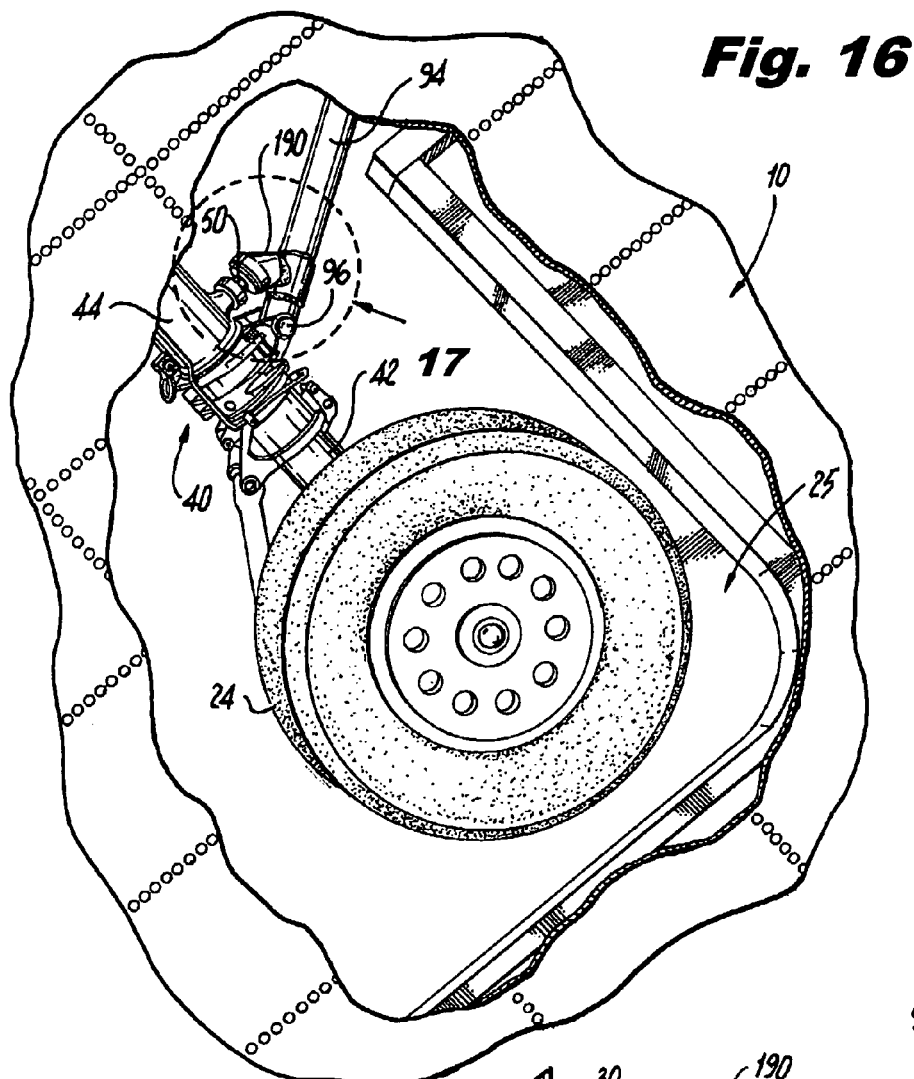
FIG. 16 is a cutaway view of the aircraft of FIG. 1 illustrating the landing gear retracted within the wheel well, with the shrink shock strut assembly disposed in a shrunk condition and the strut blocking mechanism of the subject invention depressed through interaction with a dynamic abutment structure associated with the landing gear geometry itself.
Figure 17:
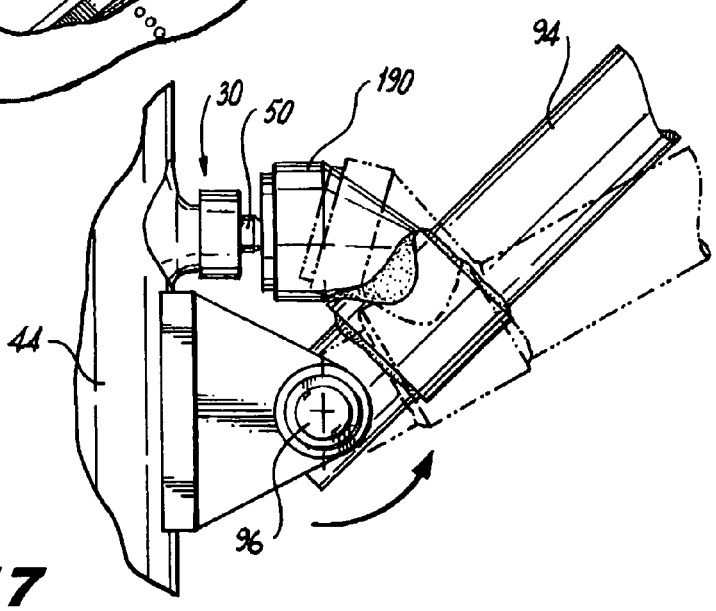
FIG. 17 is an enlarged localized view of the dynamic abutment structure shown in FIG. 16 transitioning from a first position corresponding to a deployed landing gear to a second position corresponding to a retracted landing gear.

In an alternative embodiment of the subject invention shown in FIG. 16, a dynamic abutment structure 190 is provided for moving the plunger 50 of strut locking mechanism 30 into a blocking position when the landing gear 20 is retracted into the wheel well 25 of aircraft 10. The dynamic abutment structure 190 is operatively associated with the pivoting drag brace 94 of landing gear 20, so that when the drag brace 94 rotates about pin 96 during a retraction cycle, the dynamic abutment structure 190 comes into contact with the plunger body 52, as best seen in FIG. 17.

It is envisioned that the dynamic abutment structure 190 would physically contact the body 52 of plunger 50 about midway through the retraction cycle of the landing gear 20. While the dynamic abutment structure 190 is shown in conjunction with the drag brace 94, those skilled in the art will readily appreciate that the dynamic abutment structure may alternatively be associated with a rotating spindle, a rotating collar or another part of the landing gear geometry, without departing from the spirit or scope of the subject disclosure. Dynamic abutment structure 190 is preferably formed separate from the supporting structure. It is envisioned however, that this feature can be formed integral with the gear geometry with which it is associated.

Under normal operating conditions, when the aircraft 10 is preparing for landing, the wheel well doors 27 are opened and the landing gear 20 is rotatably deployed therefrom, as illustrated in FIG. 2. Upon deployment of the landing gear 20 from the wheel well 25, the plunger 50 of locking mechanism 30 is cleared from the abutment surface 90, allowing the plunger 50 to return to its normally biased position under the influence of the internal hydrodynamic pressure within the normally operating shrink shock assembly 40. The return stroke of piston 50 could also be spring assisted. Thereupon, the plunger head 54 is retracted from capture notch 36 back into the lower chamber 74 of plunger housing 70. Consequently, the piston 42 is permitted to axially decompress without the interference of the plunger 50, allowing the shrink shock 40 to move to a fully extended condition for landing the aircraft 10.

Figure 10:
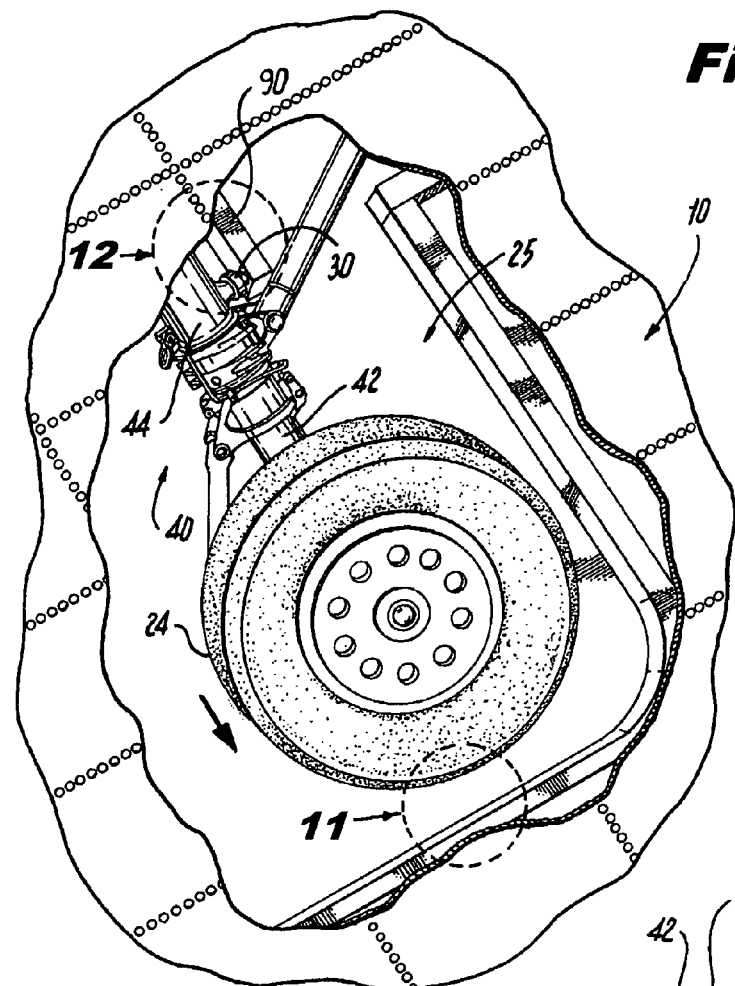
FIG. 10 is a cutaway view of the bottom surface of the aircraft of FIG. 1, illustrating the landing gear retracted within the wheel well, with the shrink shock strut assembly in a failure mode, wherein the strut piston is shown moving toward its fully extended condition, but being blocked by the engagement of the plunger in the capture notch.
Figure 11:
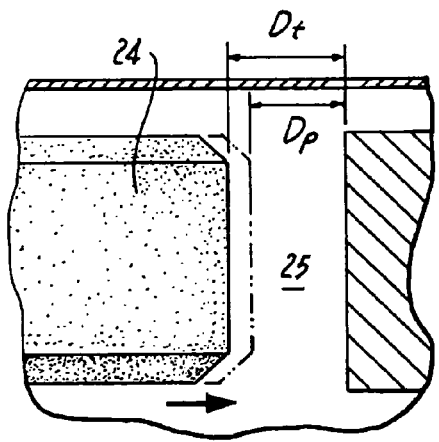
FIG. 11 illustrates the movement of the wheel of the landing gear within the wheel well of the aircraft during the failure mode of the shrink shock strut assembly shown in FIG. 10.
Figure 12:
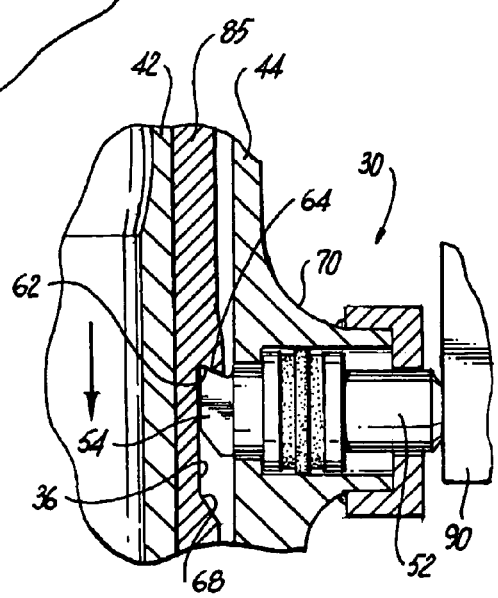
FIG. 12 is an enlarged localized view of the shrink shock strut assembly in failure mode, as shown in FIG. 10, with the strut assembly shown in cross-section to reveal the interaction of the complimentary angled engagement surfaces of the plunger head and capture notch.

Referring now to FIGS. 10 through 12, in the event of a mechanical or hydraulic failure condition within the shrink shock strut assembly 40, transfer cylinder 26, transfer conduit 28 or other component of the landing gear 20, the strut blocking mechanism 30 of the subject invention will advantageously block or otherwise prevent axial movement of the strut piston 42 into the fully extended condition within the wheel well 25, as best seen in FIG. 12. At such a time, the angled engagement surface 62 on the plunger head 54 positively engages the angled engagement surface 64 at the leading edge of capture notch 36. This positive engagement will prevent the strut piston 42 from disengaging from the plunger 50 upon deployment of the landing gear 20 from wheel well 25.

It is envisioned that the plunger head 54 and the leading edge surface of the capture notch 36 could be provided without the complementary angled engagement surfaces 62, 64, and instead with opposing orthogonal abutment surfaces, whereby the frictional contact forces between the two facing structures would be sufficient to prevent the plunger head from disengaging from the capture notch.

With continuing reference to FIG. 10, as a result of the positive engagement of the plunger 50 and capture notch 36, the failed or otherwise locked shrink shock strut assembly 40 will only be permitted to decompress or otherwise extend a short axial distance within the wheel well 25 of the aircraft 10, as shown schematically in FIG. 11, wherein the permitted decompression distance $D_p$ is less than the total decompression distance $D_t$ available within the wheel well 25 upon failure of the shrink shock compression system. In this partially decompressed condition, landing gear 20 will be able to freely deploy from the wheel well 25 for landing. However, this means that the aircraft 10 will land with the shock strut assembly 40 being locked in a partially shrunk condition of FIG. 11. By way of example, for a strut assembly with 15 inches of total stroke and 5 inches of shrink, a failed strut assembly would only have about 10 inches of stroke for landing, providing a capability of 82% of the limit sink rate.

While not preferable, this would still be sufficient to safely land the aircraft with the failed and locked shrink shock assembly.

Figure 13:
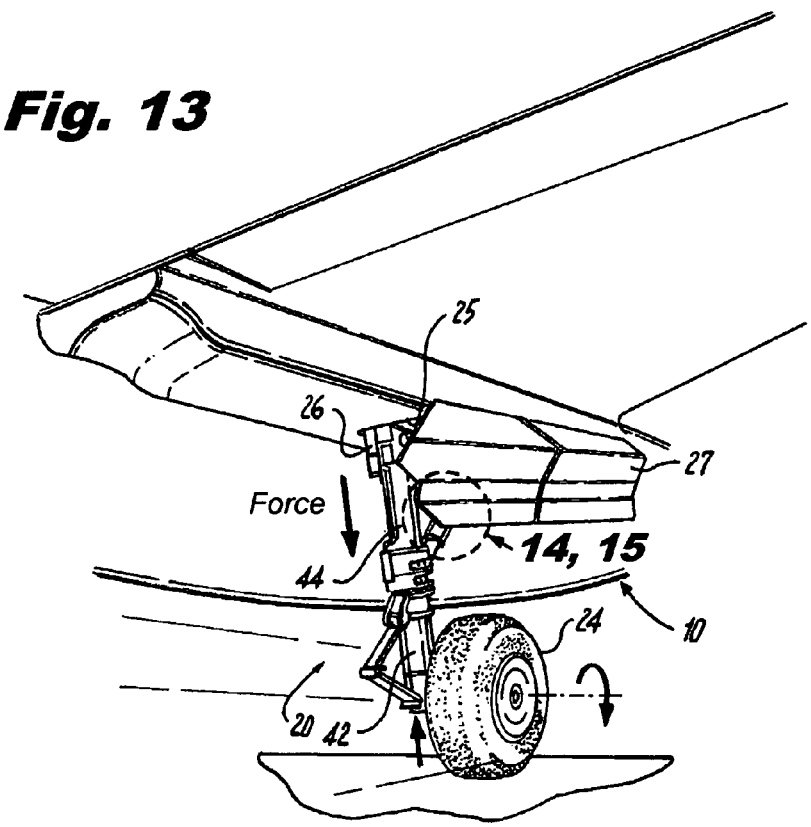
FIG. 13 is an illustration of the aircraft landing gear in a deployed position while in failure mode, wherein upon touching down for landing, the strut piston is compressively forced into a compressed position within the strut cylinder.
Figure 14:
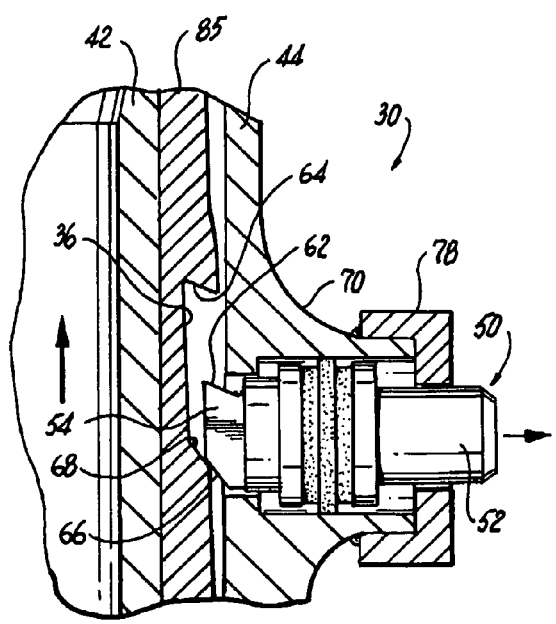
FIG. 14 is an enlarged localized cross-sectional view of the shrink shock strut assembly shown in FIG. 13, wherein upon landing, compression of the strut piston into the strut cylinder causes the plunger head to disengage from the capture notch and return to its normally retracted position under the influence of the hydrodynamic pressure within the strut assembly, aided by the interaction of the complementary camming surfaces of the notch and plunger head.
Figure 15:
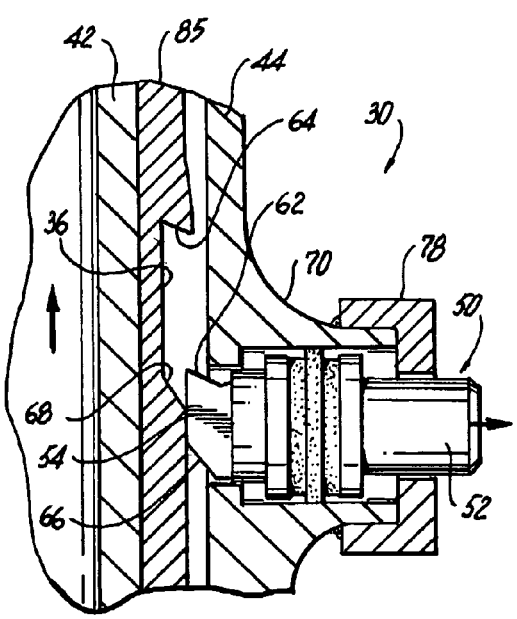
FIG. 15 is an enlarged localized cross-sectional view of the shrink shock strut assembly as shown in FIG. 14, wherein the head of the plunger is fully disengaged from the capture notch and is shown moving into a retracted position, as the strut piston compresses into the strut cylinder.

As illustrated in FIG. 13, once the wheel 24 of the landing gear 20 of aircraft 10 touches the ground, the shrink piston 42 is forcibly urged upwards into the shrink cylinder 44. This forced axial compression causes the complementary angled engagement surfaces 62, 64 of the plunger head 54 and capture notch 36 to disengage from one another, as shown in FIG. 14. As the shrink piston 42 continues to compress into the shrink cylinder 44, the complementary angled camming surfaces 66, 68 of the plunger head 54 and capture notch 36 interface with one another, urging the plunger 50 radially outward toward its normally retracted position within plunger housing 70, as shown in FIG. 15. The radial outward movement of the plunger could be spring assisted as well. The mechanical interaction of the camming surfaces 66, 68 ensures that the plunger head 54 will not remain within the capture notch 36 of strut bearing assembly 40 in the event that the hydraulic biasing pressure within the failed shrink shock assembly 40 is insufficient to return the plunger 50 to its retracted position, in the time frame of a landing event.

Those skilled in the art will readily appreciate that the location of the plunger 50 and the capture notch 36 of the strut locking mechanism 30 can vary depending upon the geometry of the landing gear 20. Moreover, it should be understood that the capture notch 36 of strut locking mechanism 30 could be formed in a location other than the upper strut bearing assembly 85, so long as it is operatively associated with the reciprocating strut piston 42. The location of the plunger 50 within the strut cylinder 44 would depend largely upon the location of the capture notch 36. In any event, those skilled in the art will readily appreciate from the foregoing detailed description, that the strut locking mechanism 30 of the subject invention functions to prevent movement of a shortened or shrunken shock strut into a fully extended condition while it is retracted within the wheel well of an aircraft, while creating a relatively stiff load path and taking up a minimal amount of space with the wheel well.

While the subject invention has been described with respect to preferred and exemplary embodiments, those skilled in the art will readily appreciate that various changes and/or modifications can be made to the invention without departing from the spirit or scope of the invention as described herein. For example, those skilled in the art will readily understand that the shrink shock strut assembly described and illustrated herein can be adapted for use in conjunction with main body landing gear or nose mounted landing gear. It should also be understood that the shrink shock strut assembly described and illustrated herein can be included in laterally retracting landing gear configurations as well as forward and aft retracting landing gear configurations.

What is claimed is:

1. A shrink shock strut assembly for retractable aircraft landing gear, comprising:
    a) an elongated strut cylinder;
    b) an elongated strut piston coaxially mounted for reciprocal movement within the strut cylinder between a shrunk condition when the landing gear is retracted into a wheel well of an aircraft and a fully extended condition when the landing gear is deployed from the wheel well for landing the aircraft; and
    c) a blocking mechanism operatively associated with the strut cylinder and mounted for movement into a blocking position with respect to the strut piston, when the landing gear is retracted within the wheel well, to prevent axial movement of the strut piston into the fully extended condition within the wheel well, wherein, a capture notch is associated with the strut piston to engage the blocking mechanism in the event that the strut piston moves toward the fully extended condition within the wheel well, and wherein the blocking mechanism comprises a plunger mounted for movement from a retracted position spaced from the strut piston to the blocking position relative to the capture notch; and d) a dynamic abutment structure for moving the plunger into the blocking position when the landing gear is retracted into the wheel well.

2. A shrink shock strut assembly as recited in claim 1, wherein the capture notch and a head portion of the plunger have complementary angled engagement surfaces.

3. A shrink shock strut assembly as recited in claim 1, wherein the plunger is normally biased into the retracted position by hydrodynamic pressure.

4. A shrink shock strut assembly as recited in claim 1, wherein the dynamic abutment structure is associated with the landing gear.

5. A shrink shock strut assembly for retractable aircraft landing gear, comprising:
    a) an elongated strut cylinder;
    b) an elongated strut piston having an upper end portion coaxially mounted for reciprocal movement within the strut cylinder between a shrunk condition when the landing gear is retracted into a wheel well of an aircraft and a fully extended condition when the landing gear is deployed from the wheel well for landing the aircraft;
    c) a strut bearing connected to the upper portion of the strut piston within the strut cylinder and having a capture notch formed therein; and
    d) a plunger operatively associated with the strut cylinder, mounted for movement between a retracted position spaced from the strut bearing when the strut piston is in a fully extended condition deployed from the wheel well of the aircraft and a blocking position with respect to the capture notch when the strut piston is in a shrunk condition within the wheel well of the aircraft, to prevent axial movement of the strut piston into the fully extended condition within the wheel well; and d) a dynamic abutment structure for moving the plunger into the blocking position when the landing gear is retracted into the wheel well.

6. A shrink shock strut assembly as recited in claim 5, wherein the capture notch of the strut bearing and a head portion of the plunger have complementary angled engagement surfaces.

7. A shrink shock strut assembly as recited in claim 5, wherein the plunger is normally biased into the retracted position by hydrodynamic pressure.

8. A shrink shock strut assembly as recited in claim 5, wherein the dynamic abutment structure is associated with the landing gear.

* * * * *